United States Patent

[11] 3,612,144

| [72] | Inventors | Roy B. Marcum;<br>George K. Chandler, both of Bartlesville, Okla. |
|---|---|---|
| [21] | Appl. No. | 793,511 |
| [22] | Filed | Jan. 23, 1969 |
| [45] | Patented | Oct. 12, 1971 |
| [73] | Assignee | Phillips Petroleum Company |

[54] RECOVERY OF POLYMER FINES BY SPRAY DRYING
7 Claims, 1 Drawing Fig.

[52] U.S. Cl. .................................................. 159/48, 159/3
[50] Field of Search ...................................... 159/48, DIG.10, 2, 2 E, 3

[56] References Cited
UNITED STATES PATENTS

| 2,949,447 | 8/1960 | Hawkins et al. ............... | 260/93.7 |
| 2,970,991 | 2/1961 | Cines ............................... | 260/94.9 F |
| 3,037,011 | 5/1962 | Liebson et al. ............... | 260/93.7 |
| 3,110,707 | 11/1963 | Bua et al. ....................... | 260/93.7 |
| 3,261,695 | 7/1966 | Sienkiewicz et al. ......... | 99/207 |

FOREIGN PATENTS

| 15,231 | 9/1929 | Australia ....................... | 159/48 |

Primary Examiner—Norman Yudkoff
Assistant Examiner—J. Sofer
Attorney—Young and Quigg ABSTRACT: A polymer diluent mixture is flashed. Polymer containing residual diluent is conveyed to a location remote from the flashing zone where the residual diluent is purged. Vaporous diluent containing polymer fines taken overhead from the flashing zone is separated into a purified diluent stream and a polymer fines stream, the latter being admixed with the polymer leaving the flashing zone.

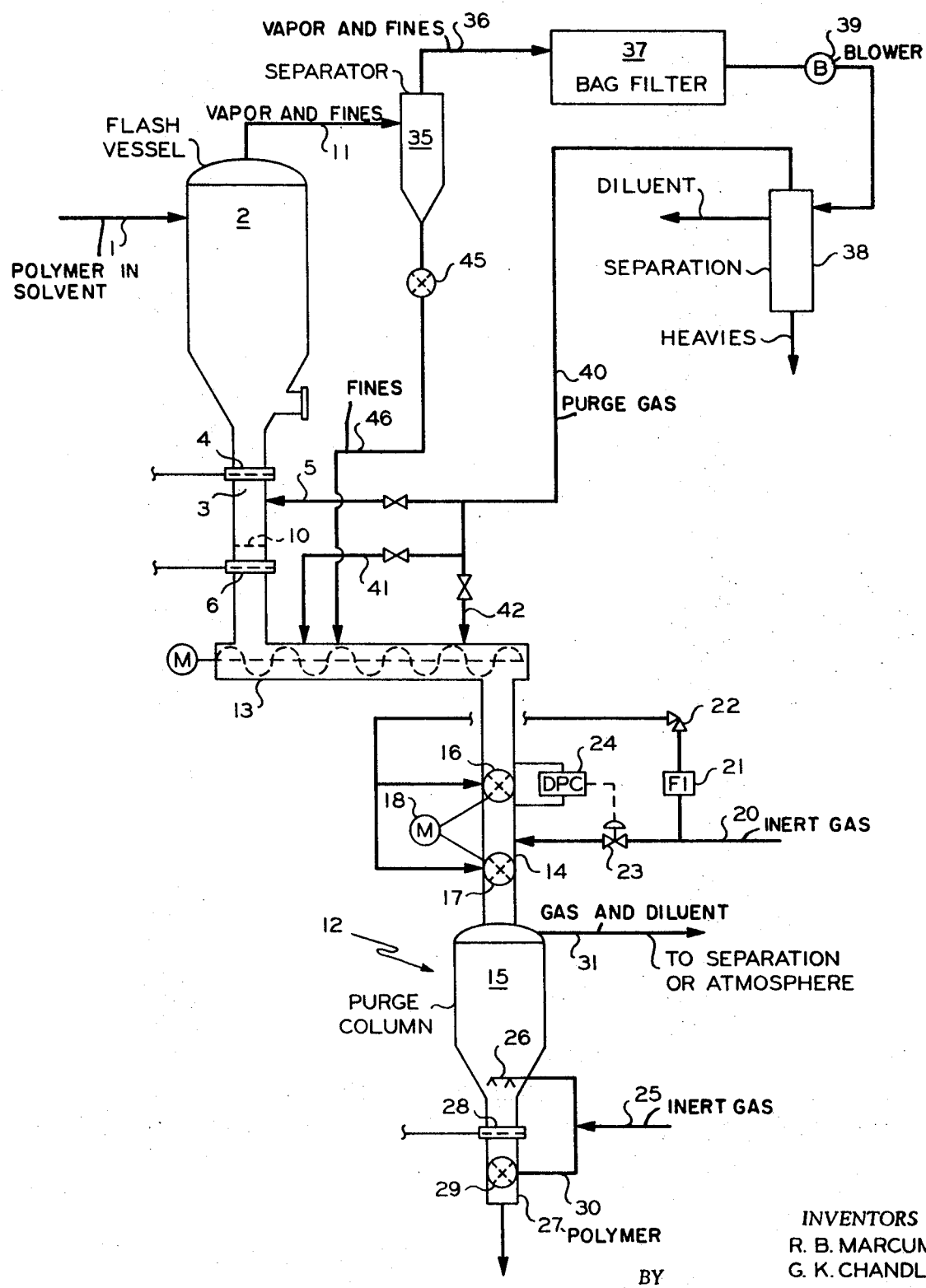

RECOVERY OF POLYMER FINES BY SPRAY DRYING

BACKGROUND OF THE INVENTION

The product of numerous polymerization processes consists of polymer dissolved or entrained in a diluent which is utilized during the polymerization reaction. The polymer is recovered by flashing the diluent therefrom, thus providing a polymer product containing residual diluent together with an overhead stream of vaporized diluent containing fine particles of polymer. The flashing may be conducted in a conventional flash drum or in a fluidized bed operation. In either case, the polymer containing residual diluent is withdrawn and passed to a location remote from the bed where the residual diluent is removed by purging with an inert gas.

Heretofore, it has been common practice to introduce the flashed vapors containing polymer fines to a centrifugal separator where the polymer fines settled out and were discarded. The diluent was then purified and returned to the polymerization process. Subsequently, it was proposed to return the polymer fines to the flashing zone. While this was satisfactory for many applications, the fines oftentimes built up to an excessively high degree in the flashing zone and centrifugal separation zone. Moreover, when the polymer was polyethylene or ethylene-butene copolymers, the melt index of the fines was found to differ significantly from the melt index of the bulk of the particles recovered from the flash separation step. This resulted in a nonhomogenous product which was unsuitable for many applications.

BRIEF DISCUSSION OF THE INVENTION

In accordance with this invention, the polymer fines are admixed with the flashed polymer as it is being conveyed from the flashing zone to the purging zone, whereby the polymer fines are not recycled to the flash tank. In this manner, the buildup of polymer fines in the flashing tank and centrifugal separator is effectively prevented. Advantageously, the polymer fines are admixed with the withdrawn polymer while the polymer is being forced along a helical path, as by a screw conveyor or auger. In this fashion, the fines and polymer are uniformly mixed and a more homogeneous product is obtained than would be the case if the fines were returned to the flash separation step.

The solvent vapors from the centrifugal separation zone may advantageously be passed through a bag filter to remove any residual polymer. Thereafter, the diluent is separated from the bag filter effluent, and a portion of the off gas from the separation is returned to the conveying system leading from the flashing zone to the purging zone.

Accordingly, it is an object of the invention to provide an improved system for separating polymer from diluent.

It is a further object to recover polymer fines from such an operation and admix them with the flashed polymer to provide a homogenous blend of high and low melt index materials.

It is a still further object to provide such a system which is simple and reliable in operation and provides excellent separation of the diluent from the polymer.

Various other objects, advantages and features of the invention will become apparent from the following detailed description taken in conjunction with the drawing, in which:

The FIGURE is a schematic flow diagram of the separation system of the invention.

DETAILED DESCRIPTION OF THE INVENTION

A mixture of polymer and diluent is passed through a line 1 and discharged into a flashing vessel or zone 2. The polymers which can be employed in the process of the invention are polymers of ethylene, such as polyethylene or copolymers of ethylene with small amounts of higher 1-olefins such as propylene, butene-1 or hexene-1. The diluent taken overhead in the flashing vessel 2 contains fine particles which, generally speaking, differ in melt index from that of the recovered polymer. Specifically, the melt index of the fines is higher than that of the recovered polymer. In the case of high-density polyethylene, or ethylene-butene copolymers produced with isobutane diluent, the polymer fines may have a melt index above 1 while the main body of polymer withdrawn from the flash vessel may have a melt index below 0.5.

High-density polyethylene or copolymers of ethylene with propylene, butene or other 1-olefins may be produced by the method disclosed in Hogan and Banks U.S. Pat. No. 2,825,721. Alternatively, olefin polymers can be prepared utilizing the well-known organo-metal catalysts. Various other polymerization systems are known wherein the polymer product is dissolved or suspended in a diluent.

Preferably and advantageously, olefin polymers are utilized which are insoluble in the polymerization medium. For example, ethylene or ethylene and 1-butene may be polymerized in the presence of isobutane diluent with the supported chromium oxide catalyst disclosed in the aforementioned Hogan and Banks patent. In this case, as indicated previously, the polymer fines going overhead in the flash vessel 2 have a melt index above 1 while the withdrawn polymer has a melt index below 0.5.

The flash vessel may simply be a vessel maintained at reduced pressure and provided with means such as a rotating blade assembly to divide the polymer into small particles. The polymer-containing residual diluent is withdrawn from the flash vessel 2 through a conduit 3, having a pneumatically controlled slide valve 4 above a gas introduction conduit 5, and a second pneumatically controlled slide valve 6 below the conduit 5. A screen 10 is disposed within the conduit 5 just above the slide valve 6.

The diluent-polymer mixture introduced through the conduit 1 is flashed, the diluent being vaporized and withdrawn through a conduit 11 together with a certain amount of polymer fines. The polymer and residual diluent withdrawn through the conduit 3 and the slide valves 4, 6 is transferred to a remote location 12 where the diluent is purged from the polymer particles, as by treatment with an inert gas. This transfer can be effected by passing the particle through an auger or screw conveyor 13 which forces the polymer particles in a helical path from one end to the other of the conveyor whence they are discharged through a conduit 14 into a purge column 15.

There are two star valves 16 and 17 in the conduit 14 which are driven by motors 18, these valves serving to prevent the residual diluent gas from passing downwardly into the purge column 15. An inert gas, such as nitrogen, is introduced from a line 20, a portion passing through a flow indicator 21 and valve 22 to the star valves 16 and 17. Another portion of the gas from the line 20 passes into the conduit 14 between the star valves 16, 17 under the control of an automatic valve 23 which is regulated by a differential pressure controller 24 connected to opposite sides of the star valve 16.

In the purge column 15, the polymer containing residual diluent is contacted with an inert gas which is fed through a line 25 to a sparger 26 located at the bottom of the purge column 15. The polymer, stripped of residual diluent, is removed from the column 15 through a conduit 27 under the control of a pneumatically operated slide valve 28 and a star valve 29. A portion of the inert gas from the line 25 is injected into the star valve 29 through a line 30.

The inert gas containing the residual diluent leaves the top of the purge column 15 and passes through a conduit 31 to atmosphere through a separator for removing any fine particles present.

In the system, as thus far described, it will be evident that the polymer is separated from the bulk of the diluent in the flash tank 2. Thence, polymer particles containing residual diluent are discharged by the conveyor 13 and conduit 14 into the purge column 15 where they are treated with an inert gas to remove residual solvent. The recovered polymer may be pelleted, or bagged for use or sale.

In accordance with the invention, the vaporous diluent passing overhead from the flash vessel 2 through the conduit 11 is introduced into a centrifugal separator 35 wherein the fine polymer particles are separated by gravity while the solvent goes overhead through a conduit 36 and into a bag filter 37. The bag filter removes any traces of polymer remaining in the diluent, which is then discharged as side draw product from a separation system 38. Heavy materials are discharged as bottom product. The off gas from the bag filter passes through a blower 39, from which a portion flows to a conduit 40. It is utilized as purge gas, a portion passing to the conduit 5 and the rest passing through valved lines 41, 42 to the conveyor 13. Some of the gas from separation 38 is passed through line 40 and the remainder through a vent conduit not shown.

The polymer fines are discharged downwardly through a star valve 45 and a conduit 46 to the upstream portion of the conveyor 13 wherein they are intimately admixed with the polymer withdrawn from the vessel 2 as it is being transferred to the location 12 for purging of residual diluent. The star valve 45 discharges the fines batchwise into the conduit 46 and prevents vapor flow from the conveyor 13 back into the separator 35. Thus, the polymer fines are recovered as product instead of being lost from the system, and there is no problem of fines buildup in the flashing vessel 2 and centrifugal separator 35. Due to the thorough mixing in the conveyor 13, a very homogenous product results, particularly when the product passed from the conduit 27 is utilized to form pellets. As stated, where the polymer is high-density polyethylene, or an ethylene-butene copolymer insoluble in the diluent, the melt index of the fines is substantially higher than that of the polymer recovered from the fluidized bed. Accordingly, when pelleted, a matrix of low melt index material is formed with the interstices filled with high melt index material.

Other variations and modifications of this invention will be apparent to those skilled in the art without departing from the spirit and scope of the invention.

We claim:

1. The method of separating a polymer of ethylene from diluent which comprises flashing a stream containing said polymer and diluent, withdrawing polymer containing residual diluent from the flashing zone, conveying the withdrawn polymer to a remote location through a path of flow in which there is no diluent removal from said path of flow, purging residual diluent from the withdrawn polymer at said remote location, recovering polymer free of residual diluent, withdrawing a stream of gas which contains diluent vapors containing entrained polymer fines from the flashing step, separating the gas which contains diluent vapors from the polymer fines, and admixing the polymer fines with said withdrawn polymer as it is being conveyed to said remote location through said path to provide a homogeneous blend having a melt index intermediate that of said withdrawn polymer and said polymer fines.

2. The method of claim 1, wherein batches of the polymer fines are discharged intermittently into a zone communicating with the path of the withdrawn polymer, thus preventing flow of vapors from said path to the polymer fines separation step.

3. The method of claim 2, wherein the withdrawn polymer is forced along a helical path as it is conveyed to said remote location.

4. The method of claim 1, wherein the polymer is polyethylene, or an ethylene-higher 1-olefin copolymer, the polymer fines having a melt index above 1 and the withdrawn polymer having a melt index below 0.5.

5. In the method of claim 1, filtering the gas which contains diluent vapors separated from the polymer fines to remove traces of polymer fines and recovering the filtered diluent.

6. In the method of claim 5, utilizing the filtered gases from the filtering step to purge residual diluent from the polymer.

7. The method of claim 6, wherein the polymer is polyethylene, a copolymer of ethylene and butene-1, or a copolymer of ethylene and hexene-1, and the withdrawn polymer is forced along a helical path as it is conveyed to said remote location.